United States Patent

[11] 3,556,502

[72] Inventors Paul Rheinlander;
Heinz Schumacher, Wolfenbuttel; Paul Hahnel, Salzgitter-Lebenstedt, Germany
[21] Appl. No. 714,299
[22] Filed Mar. 19, 1968
[45] Patented Jan. 19, 1971
[73] Assignee Salzgitter Huttenwerk Aktiengesellschaft
Salzgitter-Drutte, Germany
a corporation of Germany

[54] REACTION VESSEL FOR REACTING TOGETHER TWO LIQUIDS OF DIFFERENT SPECIFIC GRAVITIES
9 Claims, 15 Drawing Figs.
[52] U.S. Cl. .................................................. 266/37, 210/83, 222/166
[51] Int. Cl. ..................................................... C21c 7/04
[50] Field of Search .......................................... 266/34, 36P, 37, 38, 39; 222/166, 457; 137/172; 210/77, 83, 385

[56] References Cited
UNITED STATES PATENTS
| | | | |
|---|---|---|---|
| 2,129,050 | 9/1938 | Dumas et al. ................ | 222/166 |
| 2,360,065 | 10/1944 | Lewis .......................... | 266/37 |
| 3,308,953 | 3/1967 | Hinshaw ...................... | 210/83 |

Primary Examiner—J. Spencer Overholser
Assistant Examiner—John E. Roethel
Attorneys—Curt M. Avery, Arthur E. Wilfond, Herbert L. Lerner and Daniel J. Tick ABSTRACT: A reaction vessel for reacting together two liquids of different specific gravities, for example molten iron and slag in a steel-making process, is mounted so that it can be tilted about two horizontal axes at right angles to each other and is provided with two peripheral outlets, one for the lighter liquid, such as slag and the other for the heavier liquid such as molten iron, and these outlets are disposed so that the flow of one liquid through one of them is controlled by tilting the vessel about one axis and the flow of the other liquid through the other outlet is controlled by tilting the vessel about the other axis so that the two liquids can be run off from the vessel either one at a time or both simultaneously, with the rates of flow of the two liquids being independently controlled in dependence upon the angles of tilt about the two axes.

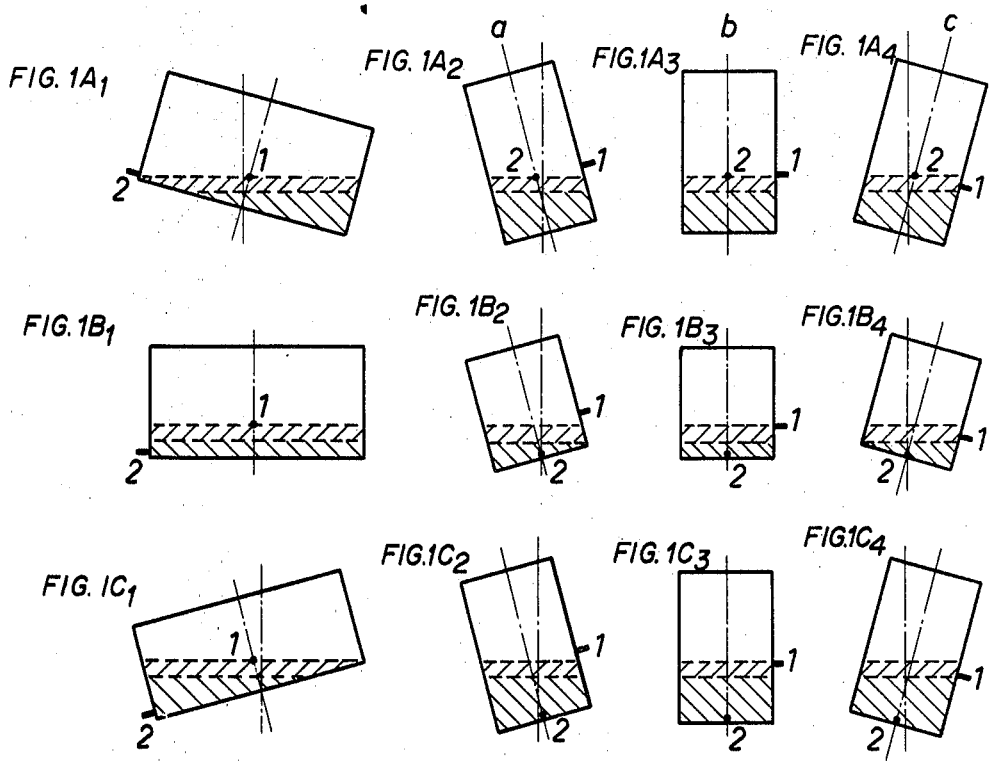
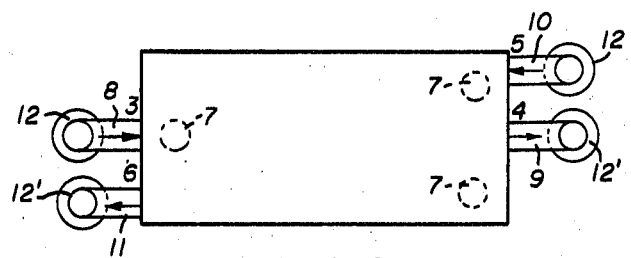
FIG. 2

REACTION VESSEL FOR REACTING TOGETHER TWO LIQUIDS OF DIFFERENT SPECIFIC GRAVITIES

In chemical and metallurgical processes two liquids of different specific gravities are often reacted together in suitable vessels. For example, in iron and steel making, molten iron and slag are reacted together in open hearth furnaces. There are other reaction vessels which can be tilted about a horizontal axis, for example crane ladles, drum mixers, tilting Siemens-Martin furnaces, through-blow and top-blow converters, and electric furnaces. Iron is also processed in furnaces which can be rotated about a longitudinal axis and can also be tilted or pivoted about a transverse axis, for example in the Stuerzelberg furnace, the Graef rotary converter and the Kaldo converter.

However, all these furnaces and other vessels have the disadvantage that the two liquids, for example the iron and the supernatent slag, cannot be run off independently. When the slag is being tapped off the flow must be interrupted as soon as iron begins to run off with the slag. On the other hand, when iron alone is being drawn off the slag floating on top of the iron has to be held back. During the decanting or retaining of stiffened slag the flow of only one of the two liquids is controllable. A clean separation of iron from slag cannot be obtained in this way. Nevertheless these methods are used, in spite of their disadvantages, because the use of syphons or skimmers, although giving a better separation, is cumbersome in manipulation, and here again the flow of only one of the two liquids can be controlled.

These disadvantages are overcome by the invention in an effective and surprisingly practical way. According to the invention, such a reaction vessel is mounted so that it can be tilted about two horizontal axes at right angles to each other and has two peripheral outlets one for the lighter liquid and the other for the heavier liquid, the outlets being disposed so that the flow through one outlet of one liquid is controlled by tilting the vessel about one axis and the flow of the other liquid through the other outlet is controlled by tilting the vessel about the other axis.

In this way, either only one liquid, for example slag, or only the other liquid, for example iron can be run off from the vessel, or both liquids can be run off simultaneously. Furthermore the rates of flow of the two liquids can be controlled independently, by tilting about the one or the other axis, the rate of flow of each liquid depending as it does, assuming that all other conditions such as tapping hole area and liquid viscosity remain constant, on the hydrostatic pressure, that is to say on the height of the column of liquid above the outlet.

An example of a reaction vessel constructed in accordance with the invention is illustrated diagrammatically in the accompanying drawings in which:

FIGS. $1A_1$ to $1A_4$, $1B_1$ to $1B_4$ and $1C_1$ to $1C_4$ show the various positions which can be assumed by the vessel, and indicate how the position influences the rates of flow of the two liquids, for example slag and iron being run out of the vessel;

FIG. 2 is a plan view of the vessel;

Figure 3:
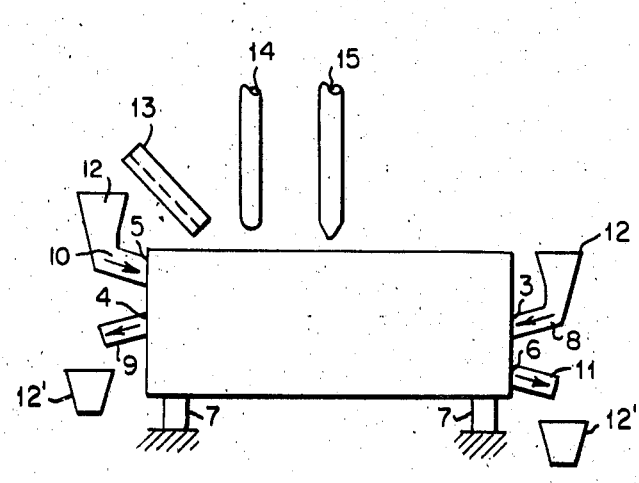
FIG. 3 is a diagrammatic view of the vessel with auxiliary equipment.

FIGS. $1A_1$, $1B_1$ and $1C_1$ there are shown three different positions of the vessel when it is tilted about a transverse horizontal axis. FIGS. $1A_2$, $1A_3$ and $1A_4$; $1B_2$, $1B_3$ and $1B_4$; and $1C_2$, $1C_3$ and $1C_4$ show three positions, respectively, of the vessel when it is rotated about a longitudinal horizontal axis for the positions of tilt about a transverse horizontal axis shown in FIGS. $1A_1$, $1B_1$ and $1C_1$, respectively. In each of the diagrams a tap for the lighter liquid is shown at 1 and a tap for the heavier liquid at 2.

The rate of flow of each liquid is determined by the liquid height above the tap hole. The rates of flow are as follows, for the 12 positions shown:

| Iron | | Slag | |
| --- | --- | --- | --- |
| Fig. $1A_1$—no flow. | Fig. $1A_2$—no flow. | Fig. $1A_3$—medium. | Fig. $1A_4$—rapid. |
| Fig. $1B_1$—medium. | Fig. $1B_2$—no flow. | Fig. $1B_3$—medium. | Fig. $1B_4$—rapid. |
| Fig. $1C_1$—rapid. | Fig. $1C_2$—no flow. | Fig. $1C_3$—medium. | Fig. $1C_4$—rapid. |

It will be seen that the rates of flow of the two liquids can be controlled independently all the way from zero to the maximum in each case.

The simultaneous control of the rates of outflow of two liquids from a vessel independently allows these two flows to be regulated in agreement with the specified reaction times for each, so that a continuous exchange of materials under the best conditions is obtained. With this an important basis is established for the development of a continuous process for making steel from pig iron by the action of refining substances.

Important advantages are obtainable by running the two liquids in countercurrent through the vessel. The arrangement of tapping holes, one in the end and one in the side of the vessel as represented in FIG. 1, does not favour countercurrent operation. For this purpose it is an improvement to position the inlet and outlet openings for the two liquids at opposite ends of the vessel.

With reference to FIG. 2, the iron enters the vessel at a first peripheral inlet 3 from a spout 8 of a ladle 12 and leaves at 4 through a spout 9 leading to a ladle 12'. The slag enters at a second peripheral inlet 5 from a spout 10 of a ladle 12 and leaves at 6 through a spout 11 leading to a ladle 12'. The two liquids thus flow in countercurrent to each other. Tilting means 7 are provided for tilting the container about a first and second horizontal axis, namely the longitudinal and transverse axes of the vessel.

Figure 4:
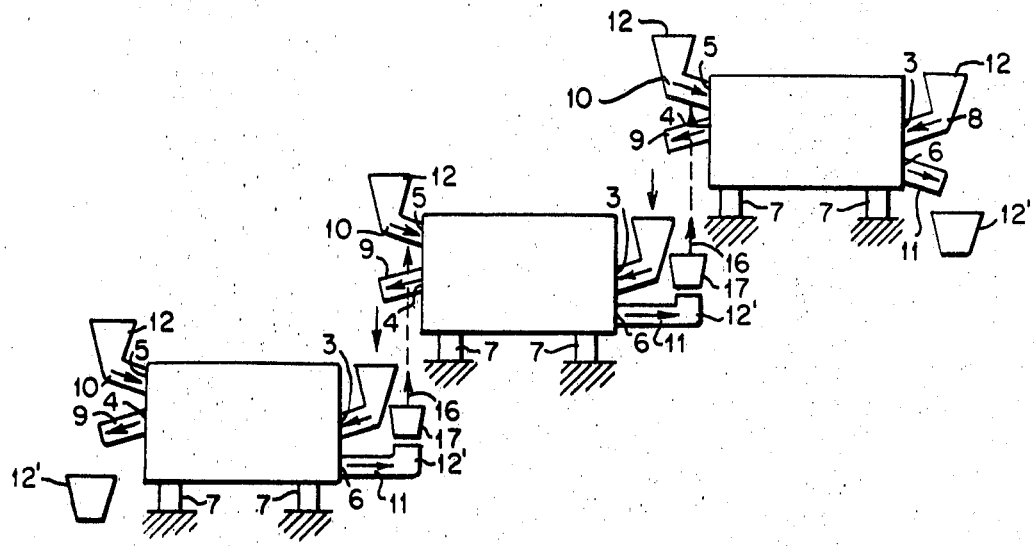
FIG. 4 is a diagrammatic view of three of the vessels of the invention in cascade formation.

Further advantages may be obtained by using several vessels in cascade formation supported at different floor levels as shown schematically in FIG. 4. The arrangement can for example be such that the iron flows from a first vessel under gravity into a second, the slag being lifted from the outlet 6 of the second vessel up to the inlet 5 of the first by lifting means 17. In each vessel the two liquids flow in countercurrent to each other.

The vessels are also equipped with devices necessary for conducting the desired reactions, and for feeding solid or liquid materials, for heating, cooling, blowing gases by bottom or top blow and for removing the reaction products. Thus as shown diagrammatically in FIG. 3, solid material is fed through a chute 13 and liquid through a slag inlet duct 10, gas is blown through a blower lance 14, and heat is furnished by a burner 15.

The vessel described above is applicable, to give a few examples, for the following processes:

It can be used for separating a mixture of iron and slag, by introducing the mixture into the vessel with the vessel so inclined that the iron flows out of one outlet and the slag out of the other.

It can be used in desulfurizing pig iron with a liquid soda slag, the liquid slag being allowed to flow through the vessel either in crosscurrent or in countercurrent to the stream of iron.

It can be used in the removal of sulfur from iron by means of a liquid lime slag.

It can be used in removing silcon from iron by means of a gas mixture containing oxygen, or by means of slags containing oxygen.

We claim:

1. A reaction vessel for reacting together two liquids of different specific gravities, said vessel comprising a container for containing said liquids, means pivotally mounting said container for tilting movement about a first horizontal axis, means pivotally mounting said container for tilting movement about a second horizontal axis at right angles to said first axis, means defining a first peripheral outlet from said container for one of said two liquids and means defining a second peripheral outlet in said container for the second of said two liquids, said outlets being disposed so that the flow through said first outlet of said one liquid is controlled by tilting said container about said first axis and the flow of said second liquid through said second outlet is controlled by tilting said container about said second axis.

2. A vessel as claimed in claim 1, further comprising means defining a peripheral inlet for said one liquid and means defining a second peripheral inlet for said second liquid, said first and second inlets and said first and second outlets being so positioned that said liquids flow through said container in countercurrent.

3. A vessel as claimed in claim 1, further comprising means defining a peripheral inlet for said one liquid and means defining a second peripheral inlet for said second liquid, said first and second inlets and said first and second outlets being so positioned that said liquids flow through said container in crosscurrent.

4. A vessel as claimed in claim 1, further comprising means for feeding solids to said container.

5. A vessel as claimed in claim 1, further comprising means for feeding liquids to said container.

6. A vessel as claimed in claim 1, further comprising means for blowing gas through said liquids in said container.

7. A vessel as claimed in claim 1, further comprising means for blowing gas onto the surface of said liquid in said container.

8. A vessel as claimed in claim 1, further comprising means for heating said liquids in said container.

9. Apparatus comprising a plurality of vessels as claimed in claim 2, means supporting said vessels in cascade formation whereby said one liquid flows through said vessels in sequence under gravity, and lifting means for lifting said second liquid from one of said vessels to another of said vessels whereby said second liquid flows through said vessels in countercurrent to said one liquid.